UNITED STATES PATENT OFFICE.

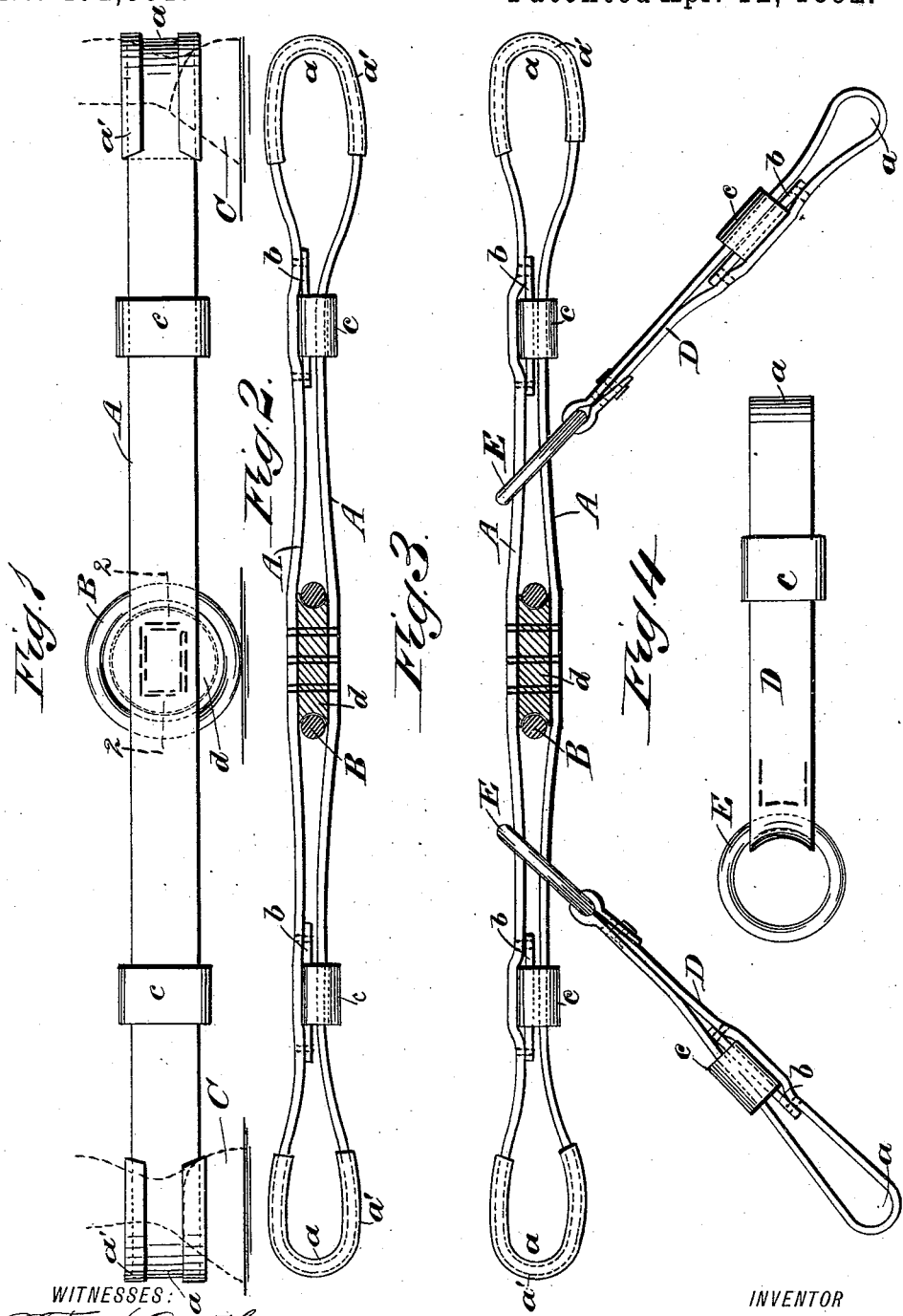

GEORGE P. COLE, OF SARATOGA SPRINGS, NEW YORK.

HOPPLE.

SPECIFICATION forming part of Letters Patent No. 472,961, dated April 12, 1892.

Application filed August 18, 1891. Serial No. 402,991. (No model.)

*To all whom it may concern:*

Be it known that I, GEORGE P. COLE, of Saratoga Springs, in the county of Saratoga and State of New York, have invented a new and useful Animal-Fetter, of which the following is a full, clear, and exact description.

This invention relates to an improved fetter for horses and other four-footed domestic animals that it is usual to secure by such an attachment, and has for its object to provide a simple and secure fetter which will be applicable to two, three, or four feet of the quadruped, as may be desired.

To this end my invention consists in the construction and combination of parts, as is hereinafter described and claimed.

Reference is to be had to the accompanying drawings, forming a part of this specification, in which similar letters of reference indicate corresponding parts in all the views.

Figure 1 is a view of the device applied to two feet of a quadruped. Fig. 2 is a plan view of the device shown in Fig. 1, partly in section, taken on the line 2 2 in said figure.
Fig. 3 is a partly-sectional plan view of the fetter, taken on the same line as Fig. 2, with parts attached to fetter the remaining two feet of a horse or other four-footed beast; and Fig. 4 is a side view of one of the auxiliary fetter-pieces.

The device shown in Figs. 1 and 2 consists of a two-ply fetter-strap A, which is made, preferably, of leather, other strong pliable material being also available. A sufficient length is given to the folded two-ply strap A for efficient service and must be regulated to suit the size and nature of the animal upon which the device is to be applied.

At the bights $a$ of the strap A thickening-pads $a'$ are secured around the edges of the same, so as to envelop the folded portions and render them non-liable to injure the limbs of the animal when applied thereon. A proper distance from each of the padded looped portions $a$ of the fetter-strap A, upon the inner surface of one ply of the same, a retaining-strip $b$ is attached by its ends, and between parts of the main strap-ply whereon the strips are placed and the inner faces of said strips keeper-loops $c$ are inserted, which loops are continuous bands and are caused to encircle the other ply of the fetter-strap A.

The retaining-strips $b$ are designed to limit the travel of the keeper-loops $c$ and only allow the loop at each end of the fetter to be distended sufficiently to pass over the hoof of the animal. This will prevent the fetter-loops from dropping off of the animal's feet when slackened.

In order that the fetter-strap may be protected from contact with the ground, I provide an anti-friction wheel or roller, which is pivoted to the strap intermediate of its length. This anti-friction wheel or roller consists of a ring B, which rotates upon a pivot-disk $d$, secured vertically between and connecting the two plies of the fetter-strap, as clearly shown in the drawings.

In attaching the fetter just described to two feet of a horse, either on the near or off side, the padded loops $a$ are enlarged by drawing a portion of the strap-ply that slides in the keeper-loops $c$ through said loops toward the ends of the strap named, which will permit the insertion of the feet of the animal through the open looped ends. When this has been effected, the stretching of the fetter-strap will fasten the loops loosely upon the legs of the animal above the hoofs C. (Shown in dotted lines in Fig. 1.) After the horse is fettered his movements will be natural unless he attempts to run or jump fences, when the fetter-strap will effectually arrest such improper movements. When one or two of the remaining feet are to be hoppled, this is readily effected by the use of one of the auxiliary fetter-straps D, which are of similar formation, and each consists of a shorter doubled strap having a sliding keeper-loop $c$ like those on the main fetter-strap A, which are held in place by retaining-straps $b$, so as to adapt the folded straps D to embrace the limbs of the animal, a ring E being clipped or stitched fast to the opposite end of these auxiliary straps, as shown in Fig. 4.

When one or both of the straps D are to be used, these are both or singly applied to the end portions of the fetter-strap A by slipping said folded ends $a$ through the rings E, which will allow the auxiliary fetter or fetters to extend laterally as branches toward the other feet of the animal, whereon they are attached, as has already been explained.

To remove the fetters, it is simply necessary to draw the strap-plies through the keeper-loops c sufficiently to allow the folded portions or bights a to be slipped from off the hoofs of the animals.

Having thus described my invention, what I claim as new, and desire to secure by Letters Patent, is—

1. An animal-fetter having a self-closing loop at each end and keepers embracing loosely one side or ply of each loop and secured to the opposite side or ply, whereby the loops may be expanded and contracted without the use of buckles or other fastenings, substantially as set forth.

2. An animal-fetter consisting in a doubled strap the plies of which lie face to face and keepers secured to one ply of the strap near the ends of the fetter and loosely embracing the other ply, thus forming self-closing end loops, substantially as set forth.

3. The combination, with a fetter-strap having self-closing end loops, of a vertical anti-friction wheel or roller pivoted to the fetter-strap between the two end loops to contact with the surface of the ground, substantially as set forth.

4. The combination, with a fetter formed of an endless strap the plies of which lie face to face, one ply having a keeper secured to it near each end of the fetter and loosely embracing the opposing ply to form self-closing loops, of an anti-friction wheel or roller comprising a pivot-disk secured vertically between the two plies of the strap intermediate of the loops, and a ring rotating on the disk, substantially as set forth.

GEORGE P. COLE.

Witnesses:
ANDREW R. BRUCE,
CHARLES H. FURNESS.